June 25, 1940. R. E. WILSON 2,205,641
FISHING-REEL BRAKE
Filed Jan. 15, 1938
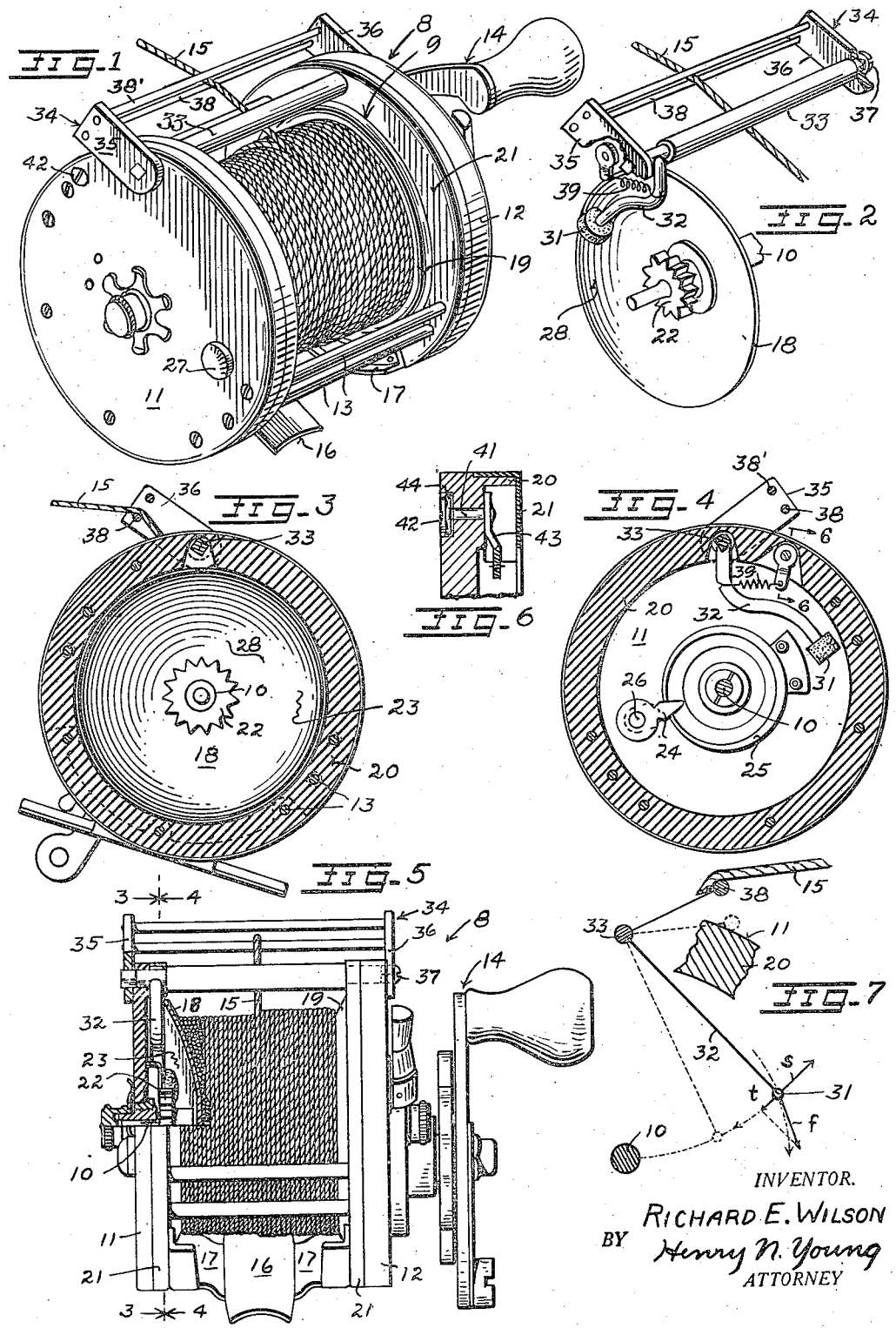
INVENTOR.
RICHARD E. WILSON
BY Henry N. Young
ATTORNEY Patented June 25, 1940

2,205,641

UNITED STATES PATENT OFFICE 2,205,641

FISHING-REEL BRAKE

Richard E. Wilson, Oakland, Calif.

Application January 15, 1938, Serial No. 185,111

3 Claims. (Cl. 242—84.5)

The invention relates to an automatic braking device for operation against the spool of a fishing-line reel to prevent the line from becoming entangled by an overrunning of the spool while the line is being unwound from the spool, as during casting.

An object of the invention is to provide a brake device which is normally operative to prevent a free spinning of the spool while permitting its ready rotation under a moderate pull on the line and is arranged to be rendered inoperative only while the pull on the out-running line exceeds a predetermined value.

Another object is to provide a brake device of the class described in which the rotary movement of the spool during an unreeling of the line therefrom tends to urge an inoperative condition of the brake means prior to a release of the brake by the pull on the line.

A further object is to provide for the ready adjustment of the value of the required brake-releasing pull while the reel is mounted for its use.

Yet another object is to provide a brake device which is readily applicable as an attachment to fish-line reels of usual present structures.

The invention possesses other objects and features of advantage, some of which, with the foregoing, will be set forth or be apparent in the following description of a typical embodiment thereof, and in the accompanying drawing, in which, Figure 1 is a perspective view of a fishing-line reel equipped with the brake means of the present invention.

Figure 2 is a perspective view of the brake device as removed from the reel and operative against an end of the reel spool.

Figures 3 and 4 are sectional views at 3—3 and 4—4 respectively in Figure 5.

Figure 5 is a rear view of the reel, a portion of the structure being shown in section at a plane through the spool axis.

Figure 6 is an enlarged fragmentary view at 6—6 in Figure 4.

Figure 7 is an enlarged diagrammatic view for illustrating the action of the braking device.

The present reel brake device is shown as it is adapted and applied to a fishing reel 8 of a usual structure whereof a line-carrying spool 9 is fixed on a shaft or spindle 10 which is journalled in and between fixedly related end plates 11 and 12 which are unitarily connected by spacing rods 13 to provide the reel frame. The reel assembly includes a usual crank handle 14 which is suitably connected to an end of the shaft 10 which extends through and from the plate 12, and is arranged for its manual operation to rotate the spool to effect a winding of the extended fishing line 15 on the spool. A usual base element 16 carries the reel assembly, said element comprising an elongated plate arranged for its fixing to and along the handle portion of a fishing pole (not shown) and having transverse extensions 17 at its opposite sides connected to the end plates 11 and 12 to fix the reel assembly to the central base member.

It will now be noted that the spool ends are provided by disc members 18 and 19 which are fixed to the shaft 10 and are oppositely dished to provide concave end faces for the spool, which faces cooperate with the opposed plates 11 and 12 respectively to define enclosed annular spaces about the spool shaft 10 and beyond the spool ends. The members 18 and 19 are shown as comprising transversely dished discs of thin metal or other suitable material, and their concave outer faces are symmetrical to the spool axis and are preferably smooth and uniformly curved radially of the spool axis, as is particularly disclosed with respect to the member 18.

Each of the end plates 11 and 12 is relatively thick, may be of Bakelite or other suitable material, and is centrally recessed at its inner face to provide an annulus 20 adjacent its peripheral edge. A ring member 21 engages each annulus 20, said member having a flat radial portion engaging the inner face of the annulus, and a cylindric flange portion extending transversely of the radial portion and engaged about the annulus which is shown as reduced slightly to receive the flange portion. The central openings of the members 21 are radially opposite and closely adjacent the peripheral edges of the spool end members 18 and 19 in the reel assembly. While the members 21 are disclosed as separately formed elements, they are actually parts of the end plates when mounted thereon and may be so considered for descriptive purposes, it being obvious that the same diametrical cross-section might be provided in a single end plate member.

A ratchet wheel 22 is fixed on the shaft 10 in the space 23 between the plate 11 and the spool end 18 for engagement with a click pawl 24 which is mounted on the plate 11 for its radial adjustment between inner and outer positions in which it respectively engages and is free of the teeth of the wheel 22. As shown in Figure 4, the pawl 24 is engaged between the ends of a C spring 25 fixed on the plate 11 whereby it may be laterally displaced by the teeth of the wheel 22 against the resistance of an end of the spring 25 when it is inwardly disposed and the spool is rotated either to wind or unwind the line 15. The disposal of the pawl 22 in its outer position, as is shown in Figure 4, prevents its engagement with the wheel 22 and frees the spool for its free spinning, as is desirable when a baited line is to be cast from the reel. The pawl 24 is carried at the end of a pin 26 extending through a radial slot in the end plate 11 and having a head 27 at its outer end, said head being arranged for its manual engagement to shift the pawl between the operative and inoperative positions thereof.

It will now be noted that the present reel brake device includes a brake shoe for operation in the space 23 and normally engaging the convex face 28 of the spool end to prevent a free, or inertia, spinning of the spool, said shoe being so controlled by the outrunning line 15 extending from the spool that a positive pull on the line will disengage the shoe from the spool end to minimize the resistance to the out-running of the line only while the pull continues. As particularly illustrated, a friction shoe 31 is provided at the free end of an arm 32 which extends rigidly from a rock-shaft 33 journalled in the reel frame for its oscillation about an axis which is parallel to the spool axis, the shoe being movable inwardly toward the spool axis to free it from the end face 28 and so release the spool for its free spinning. The shaft 33 extends through the plate 11 at the annular portion 20 thereof, and said annulus is appropriately notched out at the base portion of the arm 32 to permit the required swinging movement of the latter. The shoe 31 may comprise a cylinder of suitable material such as leather or felt, and is disposed to engage the spool end surface 28 in a line which is an element of the cylinder.

A bail-like assembly 34 spans the reel axially thereof and has one side arm 35 thereof engaging the end portion of the shaft 33 at the plate 11 for effecting the rotation of the shaft; as shown, the extending shaft portion is of polygonal section, and the inner end of the member 35 is provided with a perforation to complementarily receive said shaft end whereby the member comprises an arm for rocking the shaft. The other side member 36 of the bail 34 is pivoted at the outer side of the plate 12 in the axial line of the shaft 33.

As particularly shown, the shaft 33 extends through and between the plates 11 and 12, is shouldered at the inner sides of said plates to center it in its place while permitting its oscillation, and has the inner end of the bail arm 36 non-rotatably receiving the extremity of the shaft 33 on which it is held by means of the head of a screw 37 axially engaged in the shaft end. A cross-member, or bar, 38 connects the outer ends of the arms 35 and 36 in parallel relation to the spool axis whereby the bail assembly and the shaft 33 comprise a rockable frame for moving the brake arm 32 against the resistance of a tension spring 39 which extends from an anchorage in the annulus 20 to said arm. It will be noted that the combination of the arms 35 and 32 constitutes, in effect, a bell-crank lever with the bar 38 comprising a trigger extension of the arm 35.

When the reel is mounted on a fishing pole and the fishline 15 is extended from the reel and along the pole in a usual manner, the bail member 34 is arranged to be disposed with its plane oblique to the fishline with the trigger bar 38 thereof engaging the line forwardly of the axis of the shaft 33 to deflect the line outwardly from a straight line from the reel to the pole. In this manner, a positive pull on the line is arranged to effect an angular swinging of the bail inwardly toward the reel to release the brake means, the limit of movement being reached when the bar 38 strikes the peripheries of the plates 11 and 12 which thus function as stops to limit the rocking of the shaft 33 and the displacement movement of the brake shoe 31 within the space 23. As shown, a second cross-bar 38' extends between the bail arms 35 and 36 in parallel relation to the bar 38 and outwardly thereof with respect to the reel, whereby to define a laterally closed guideway for the fishline 15.

Since it may be desirable to adjustably vary the resistance to the displacement of the brake shoe from its full frictional engagement with the surface 28, means are provided for varying the effective tension in the spring 39. As particularly shown, a headed pin 41 is rotatably engaged through the plate 11 at the annulus 20 thereof with its head 42 slotted to receive the bit of a screwdriver, or otherwise arranged for its adjusted turning. An arm 43 extends radially and fixedly from the inner end of the pin 41, and its extremity provides the anchorage for the spring 39 whereby an appropriate turning of the pin 41 may increase or decrease the tension in the spring. The arm 43 may be retained in adjusted spring-tensioning position in any suitable manner; in the present instance, the plate 11 is frictionally gripped between the base of the arm 43 and a spring washer 44 which is compressedly engaged between the plate and the pin head 42, whereby to secure the arm 43 in adjusted position. It will be understood that both the spring pull and maximum bearing friction are relatively light at the greatest. The pin head 42 is preferably countersunk in the plate 11, as is shown in Figure 6.

Preferably, and as shown, the point of maximum bearing engagement of the brake shoe 31 with the surface 28 of the spool end 18 is so disposed with respect to the common plane of the spool and rock-shaft axes that an appreciable component of the frictional force generated as the surface 28 moves against the shoe under the pull of the outrunning line is operative to urge the shoe inwardly toward an inoperative disposal thereof. With a given amount of tension in the spring 39, an increase of the rotative speed of the spool may increase said brake-releasing component of the frictional force to exceed the effective, and opposite, spring pull to partially release the brake to establish a balance offering less resistance to unreeling. This automatic and independent action of the spool rotation is understood to increase the sensitiveness of the brake release by aiding the action of the taut line 15 to displace the bail 34 to release the brake.

By particular reference to the diagram of Figure 7, it will be noted that both the extreme inner and outer positions of the shoe 31 and the trigger bar 38 are shown, and also the operative disposal of the shoe at a point which provides for the described action of the shoe friction to urge a release of the shoe, and lighten its bearing pressure. As shown by the force diagram in Figure 7, the frictional force $f$ in the direction of the normal shoe contact circle on the surface 28 has an inward component $t$ which exceeds one-third of the force $f$ and is tangent to the arc of possible movement of the shoe and in line with the oppositely directed effective spring force $s$. If the shoe should be advanced further along the contact circle by providing a longer arm 32, the inward thrust component $t$ would be increased, and the forces $f$ and $t$ would be in alignment, and therefore equal, if the shoe were operative at a point diametrically opposite the shaft 33 from the shaft 10. On the other hand, a continued shortening of the brake arm would decrease the inward thrust component $t$ to and through zero to finally add an outer thrust to that of the spring.

A typical, and preferred disposal for the brake shoe is that shown wherein the distance of the brake shoe from the axis of the rock-shaft 33 which carries it substantially equals the distance of the rock-shaft from the spool shaft, the circle of full braking on the spool end 18 being as far out as is permitted by the annulus 20 of the plate 11. While the effective length of the brake arm 32 may be varied within the previously indicated limits, this specific arrangement provides a desirable degree of inward thrust together with quick brake shoe clearance; the latter by reason of the fact that the line of the force $t$ is not far from perpendicular to the braking circle. The actual form of the arm 32 is, of course, such as to facilitate the attachment and action of the spring 39, and to avoid interference with the swinging movement of said arm by the spool shaft 10 and the C spring 25.

While the present device is particularly shown as applied to a fishing-line reel, it will be obvious that certain features thereof are adaptable and applicable to line-carrying spools generally to prevent over-running, or back-lash, thereof during the line winding or unwinding operations with respect to the spool.

From the foregoing description taken in connection with the accompanying drawing, the advantages of the construction and method of use will be readily understood by those skilled in the art to which the invention appertains. While I have described the features and the principle of operation of a structure which I now consider to be a preferred embodiment of my invention, I desire to have it understood that the showing is primarily illustrative, and that such changes may be made, when desired, as fall within the scope of the following claims.

I claim:

1. In a fish-line reel for mounting on a fish pole, a frame, a line spool rotatably mounted on said frame and providing a concave end surface, a lever member pivoted intermediate its ends on said frame for rocking about an axis parallel to and laterally of the spool axis, one arm of said lever carrying a brake shoe for normally engaging the said spool end surface and the other arm of said lever rigidly related to the first arm and providing a trigger bar extending parallel to the spool axis and arranged to deflect the line from the pool out of its normal direction from the reel to the pole on which it is mounted, said trigger bar and shoe being disposed at the same side of the common plane of the spool axis and the axis of swinging of the lever.

2. In a fish-line reel for mounting on a supporting element, a frame, a line spool rotatably mounted on said frame and providing a concave end surface, a lever member pivoted intermediate its ends on said frame for rocking about an axis parallel to and lateral of the spool, one arm of said lever carrying a brake shoe normally engaging the said spool end surface, and the other arm of said lever providing a trigger bar extending parallel to the spool axis and arranged to deflect the fish-line from the spool outwardly of its normal straight line from the spool to the element on which the reel is mounted whereby a pull on the line to urge a straightening thereof at the bar is arranged to effect an inward swinging of its lever arm to inoperatively dispose the brake shoe, said trigger bar being arranged to engage the frame as a stop means for limiting the permitted degree of rocking of the lever by the pull on the fish-line.

3. In a fish-line reel for mounting on a supporting element, a frame, a line spool rotatably mounted on said frame and providing a spherically curved end surface, a lever member pivoted intermediately of its ends on said frame for rocking about an axis parallel to that of the spool, one arm of said lever carrying a brake shoe normally engaging the said spool end surface, and the other arm of said lever including a trigger bar extending parallel to the spool axis and arranged to deflect the fish-line from its normal stright line from the spool to the element on which the reel is mounted whereby a pull on the line to urge a straightening thereof at the bar is arranged to effect a swinging of the lever to inoperatively dispose the brake shoe, said lever being arranged to engage the frame as a stop means for limiting the permitted degree of rocking of the lever by the pull on the fish-line.

RICHARD E. WILSON.